United States Patent [19]
Meek

[11] 3,761,519
[45] Sept. 25, 1973

[54] HYDROXY-PHENYL FORMYLHYDRAZIDES

[75] Inventor: William H. Meek, Northfield, Ohio

[73] Assignee: Ferro Corporation, Cleveland, Ohio

[22] Filed: Apr. 15, 1971

[21] Appl. No.: 134,509

Related U.S. Application Data

[62] Division of Ser. No. 832,429, June 11, 1969, Pat. No. 3,641,045.

[52] U.S. Cl........ 260/559 H, 260/307 G, 260/474, 424/324
[51] Int. Cl.......................................... C07c 103/30
[58] Field of Search..................... 260/559

[56] References Cited
UNITED STATES PATENTS
3,530,173  9/1970  Aelony................ 260/559

FOREIGN PATENTS OR APPLICATIONS
584,883  10/1959  Canada................ 260/559
1,093,383  11/1967  Great Britain............ 260/559

OTHER PUBLICATIONS
R. Buu–Hoi et al., J. Org. Chem., Vol. 20, 1129–1134 (1955).

*Primary Examiner*—Harry I. Moatz
*Attorney*—Milton L. Simmons

[57] ABSTRACT

Oxadiazoles of the formula:

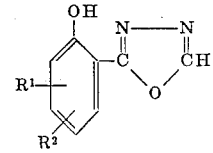

wherein $R^1$ and $R^2$ are hydrogen, halogen or hydrocarbyl providing that both Rs are not hydrogen, and novel hydrazide and formylhydrazide intermediates. The oxadiazoles are useful as bacteria growth inhibitors.

3 Claims, No Drawings

HYDROXY-PHENYL FORMYLHYDRAZIDES

This is a divisional application of copending application, Ser. No. 832,429, filed June 11, 1969, now U.S. Pat. No. 3,641,045.

This invention relates to a particular class of oxadiazoles, novel salicylic acid hydrazide intermediates, novel salicylic acid formylhydrazide intermediates, and to methods for their preparation. More particularly the oxadiazoles of this invention can be represented by the formula:

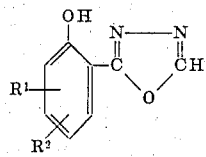

wherein $R^1$ and $R^2$ are independently selected from hydrogen, halogen and hydrocarbyl with the provision that both Rs are not hydrogen. Exemplary of suitable halogen are fluorine, bromine and chlorine. Examplary of suitable hydrocarbyl are alkyl having from one to 18 carbon atoms and aralkyl of from seven to 10 carbon atoms. The alkyl can be branched or straight chained and include for example methyl, ethyl, isopropyl, n-propyl, n-butyl, tert.-butyl, heptyl, hexyl, tert.-octyl, and n-octyl, nonyl, dodecyl, tridecyl, tetradecyl, pentadecyl, hexydecyl and octadecyl. Exemplary of suitable aralkyl are benzyl, phenylethyl and p-methylbenzyl.

The novel salicylic acid hydrazide intermediates can be represented by the formula:

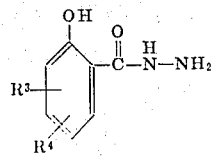

wherein $R^3$ and $R^4$ are independently selected from hydrogen and hydrocarbyl with the provision that both Rs are not hydrogen. Exemplary of suitable hydrocarbyl are listed above.

The novel salicyllc acid formylhydrazide intermediates can be represented by the formula:

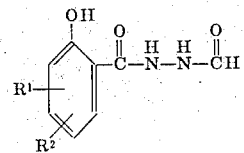

wherein $R^1$ and $R^2$ are as previously defined.

The novel salicylic acid hydrazide intermediates are prepared by reacting a hydrocarbyl substituted salicylate with hydrazine (preferably the hydrate) in accordance with the following reaction diagram:

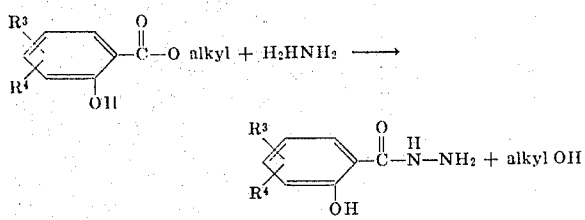

The reaction can be conducted in an inert solvent such as xylene, chlorobenzene and mineral spirits or the hydrazine hydrate can be employed in excess of stoichiometric requirements to serve partly as a solvent. Reaction times will depend on the temperature employed but generally the reaction is complete in from about one-half to about 3 hours. The reaction can be conveniently conducted at atmospheric pressure at a temperature between about 60°C. and about 150°C.

The novel oxadiazoles are prepared by reacting an alkyl substituted salicylic acid hydrazide with triethyl orthoformate.

The reaction can be conducted in an inert solvent such as xylene, chlorobenzene and diethylene glycol diethyl ether (known commercially as "Diethyl Carbitol"), or the triethyl orthoformate reactant can be employed in excess of stoichiometric requirements to serve partly as a solvent. Reaction times will depend on the temperature employed but generally the reaction is complete from about 6 to about 14 hours at a temperature between about 90°C. and about 150°C. The reaction can be conveniently conducted at atmospheric pressure. Recovery of the desired product can be effected by conventional means such as distillation, crystallization and the like.

The novel oxadiazoles can also be prepared by reacting the hydrazide intermediate with formic acid to form the formylhydrazide and then effecting ring closure with a dehydrating agent such as phosphoryl chloride, phosphorus trichloride or thionyl chloride. The reaction is illustrated by the following diagram wherein phosphoryl chloride is illustrated as the dehydrating agent.

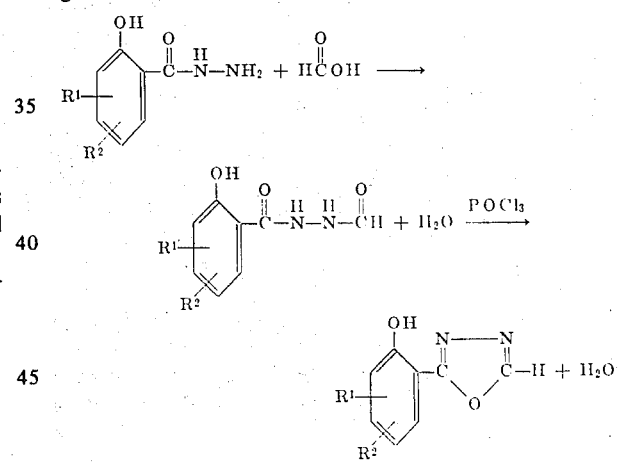

The following examples will illustrate the invention and its preferred embodiments.

EXAMPLE 1

Preparation of 3-tert.-butyl-5-methyl salicylic acid hydrazide

Into a one liter reaction flask fitted with a thermometer, agitator and distillation column were added 44.4 grams (0.2 mole) of methyl 3-tert.-butyl-5-methyl salicylate and 17.8 grams of hydrazine hydrate (85% aqueous, 0.3 mole $H_2NNH_2$). The mixture was heated to reflux temperature and maintained at that temperature for 7 hours. The mixture was then allowed to cool to room temperature and transferred to a filter funnel and washed with methanol. 41.3 grams of a light brown precipitate was recovered, m.p. 109°–111°C. The product was recrystallized from heptane, and dried in a vacuum oven at 60°C. A white crystalline product (36.8 grams) was recovered, m.p. 112°–114°C.

EXAMPLE 2

Preparation of 2-(2-hydroxy-3-tert.-butyl-5-methylphenyl)-1,3,4-oxadiazole

Employing the equipment of Example 1, 100 grams (0.45 mole) of 3-tert.-butyl-5-methylsalicylic acid hydrazide was heated at reflux temperature for 14 hours with 500 ml of triethyl orthoformate. The excess triethyl orthoformate was removed by distillation to a maximum pot temperature of 188°C. The residue, a wet solid, was slurried in methanol, filtered and vacuum dried to produce 72.5 grams (70% yield) of 2-(2-hydroxy-3-tert.-butyl-5-methylphenyl)-1,3,4-oxadiazole, m.p. 142°–143°C.; analysis: 12.0% N; theoretical 12.1% N.

EXAMPLE 3

Preparation of 5-tert.-octylsalicylic acid hydrazide (Note: Tert.-octyl here is identical with 1,1,3,3-tetramethylbutyl).

In accordance with the procedure of Example 1, 52.8 grams of methyl 5-tert.-octylsalicylate (0.2 mole) and 17.8 grams of aqueous hydrazine hydrate (containing 0.3 mole $H_2NNH_2$) were reacted at reflux temperature for one-half hour. The resultant white precipitate was filtered, washed with water, filtered again and dried to produce 49.1 grams of 5-tert.-octylsalicylic acid hydrazide. Yield 93%, m.p. 170°–172°C. The infrared spectrum was consistent with the expected structure.

EXAMPLE 4

Preparation of 2-(2-hydroxy-5-tert.-octylphenyl)-1,3,4-oxadiazole

In accordance with the procedure of Example 2, 80 grams of 5-tert.-octylsalicylic acid hydrazide (0.3 mole) and 400 ml of triethyl orthoformate were heated at reflux temperature for 14 hours. The excess triethyl orthoformate was removed by distillation under vacuum to a maximum pot temperature of 70°C. The resultant viscous solid residue was recrystallized from methanol to produce 42 grams (50% yield) of 2-(2-hydroxy-5-tert.-octylphenyl)-1,3,4-oxadiazole, m.p. 121°–129°C.; analysis, 10.4% N; theoretical 10.25% N.

EXAMPLE 5

Preparation of 2-(2-hydroxy-5-methoxyphenyl)-1,3,4-oxadiazole

In accordance with the procedure of Example 2, 50 grams (0.275 mole) of 5-methoxysalicylic acid hydrazide and 200 ml of triethyl orthoformate were heated at reflux temperature for 9 hours. The reaction mixture was cooled to a temperature of about 5°C. and filtered. The resultant solid (14.89 grams) was recrystallized from methanol, m.p. 125.5°–127°C. The excess triethyl orthoformate was removed from the mother liquor by distillation, the residue recrystallized from methanol and an additional 8.15 grams of product was recovered for a total yield of 44%. Analysis 14.2% N; theoretical 14.5% N.

EXAMPLE 6

Preparation of 2-(2-hydroxy-5-chlorophenyl)-1,3,4-oxadiazole

In accordance with the procedure of Example 2, 80 grams (0.427 mole) of 5-chlorosalicylic acid hydrazide dissolved in 250 ml of diethylene glycol diethyl ether and 500 ml of triethyl orthoformate were heated at reflux temperature (100°C.) for 14 hours. The reaction mixture was then allowed to cool, filtered and the precipitate recrystallized from methanol to yield 15.6 grams of 2-(2-hydroxy-5-chlorophenyl)-1,3,4-oxadiazole, m.p. 152.5°–154°C. The filtrate was distilled first at 760 mm and then under vacuum to a pot temperature of 152°C. The residue was recrystallized twice from methanol to produce 20.3 grams of additional product for a total yield of 47.6%. Analysis, 14.19% N; theoretical 14.25% N.

EXAMPLE 7

Preparation of N-(3-tert.-butyl-5-methyl salicyloyl)-N'-formylhydrazine

Employing the equipment of Example 1, a mixture of 11.1 grams of 3-tert.-butyl-5-methyl salicylic acid hydrazide, and 2.8 grams of formic acid in 50 ml of toluene was heated at reflux temperature for 1.0 hour. The water of reaction was collected in a Dean-Stark trap. The reaction mixture was then allowed to cool to room temperature where upon the product crystallized. The white crystals were filtered, washed with cold toluene, and dried to produce 10.5 grams of product (yield 84%), m.p. 200°–202°C.

EXAMPLE 8

Preparation of 2-(2-hydroxy-3-tert.-butyl-5-methylphenyl)-1,3,4-oxadiazole. (Compound of Example 2)

Employing the equipment of Example 1, a mixture of 7.5 grams of N-(3-tert.-butyl-5-methyl salicyloyl)-N'-formylhydrazine, 1.9 grams of phosphoryl chloride and 60 ml of toluene were heated at reflux temperature for 3½ hours. The toluene solvent was then removed by evaporation and the residue was recrystallized from methanol to produce 6.5 grams of product (Yield 93.4%), m.p. 143°–5°C.

In order to test for their effect on bacteria, the oxadiazoles of the invention are incorporated in nutrient agar to various dilutions. The bacteria cultures are streaked over the surface of the agar. The bacterial plates are incubated at 37°C. for 48 hours and then observed for the presence of growth or no growth. All of the oxadiazoles of the invention inhibit the growth of Pseudomonas aeruginosa at a concentration of not more than 0.1%. The compound of Example 4 inhibited growth at 0.02%. Pseudomonas aeruginosa is a pathogen, known to be difficult to control. The compound of Example 6 is also effective in inhibiting growth at 0.1% against Styphylococcus aureus and Escherichia coli. The compound of Example 4 inhibited Escherichia coli growth at 0.1% concentration. Inhibition against fungi is determined as follows: A mixed fungi culture composed of Aspergillus niger, Penicillium citrinum and Streptomyces rubrireticuli is streaked over the surface of a Sabouraud agar medium and the fungus plates are incubated at 27°C. for 7 to 14 days. The plates are then observed for evidence of growth. The compound of Example 6 inhibited fungal growth at 0.1% concentration.

Compounds of the invention are also useful pharmacologically for their anti-inflammation, sedative, antispasmodic and central nervous system depressant properties.

What is claimed is:

1. A compound of the formula:

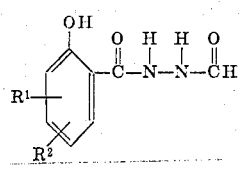

wherein $R^1$ and $R^2$ are independently selected from hydrogen, halogen, alkyl from one to 18 carbon atoms, and aralkyl selected from the group consisting of benzyl, phenylethyl, and methylbenzyl, except that both R's are not hydrogen.

2. A compound of claim 1 comprising N'-(3-tert.-butyl-5-methyl salicyloyl)-N-formylhydrazine.

3. A compound of claim 1 in which said halogen is selected from the group consisting of fluorine, bromine and chlorine.

* * * * *